United States Patent
Cutler et al.

[15] 3,667,038
[45] May 30, 1972

[54] ACOUSTO-OPTIC RF SPECTRUM ANALYSIS METHOD AND APPARATUS

[72] Inventors: Leonard S. Cutler; Donald L. Hammond, both of Los Altos Hills, Calif.

[73] Assignee: Hewlett-Packard Company, Palo Alto, Calif.

[22] Filed: June 17, 1970

[21] Appl. No.: 46,910

[52] U.S. Cl. ............................................324/77 R, 350/149
[51] Int. Cl. ....................................G01r 23/16, G01r 27/06
[58] Field of Search.........................324/77 R, 77 I; 350/149

[56] References Cited

UNITED STATES PATENTS 3,509,453    4/1970    Wilmotte..............................324/77 I

OTHER PUBLICATIONS

S. E. Harris & R. W. Wallace, Acousto–Optic Tuneable Filter, Journal of the Optical Society of America, 59(6), June, 1969, pp. 744–747

*Primary Examiner*—Michael J. Lynch
*Attorney*—A. C. Smith

[57] ABSTRACT

An acousto-optic RF spectrum analysis method and apparatus is disclosed wherein radio frequency energy to be spectrum analyzed is employed to excite an acoustic wave in an optically anisotropic medium. A linearly polarized white light beam is collinearly diffracted on the acoustic wave in the anisotropic medium to diffract light of the first polarization and of a frequency related to the frequency of the acoustic wave into light of the second polarization. The diffracted output light is then analyzed to separate light of the first polarization from light of the second polarization. The separated light is spectrum analyzed to obtain a spectrum corresponding to the spectrum of the radio frequency energy to be analyzed.

8 Claims, 6 Drawing Figures

INVENTOR.
LEONARD S. CUTLER
DONALD L. HAMMOND

INVENTOR.
LEONARD S. CUTLER
DONALD L. HAMMOND

ACOUSTO-OPTIC RF SPECTRUM ANALYSIS METHOD AND APPARATUS

RELATED CASE

The use of the output light beam 27 having the same polarization as the incident light beam is disclosed and claimed in copending U.S. application Ser. No. 047,267 filed June 18, 1970, and assigned to the same assignee as the present invention.

DESCRIPTION OF THE PRIOR ART

Heretofore, radio frequency spectrum analyzers have been built wherein a multitude of radio frequency filters have been arrayed to filter a radio frequency input signal to be spectrum analyzed. The filters separate the input radio frequency signal into its separate radio frequency components to produce a spectrum of the signal under analysis. The problem with this type of spectrum analyzer is that it requires a great many filters. As a result the spectrum analyzer is a relatively expensive and complex apparatus.

It is also known from the prior art that the band pass characteristics of an acousto-optic filter can be tuned over a relatively wide range of optical frequencies by producing a corresponding frequency change in a radio frequency wave employed to excite the acousto-optic element. More particularly, in such prior art systems, light of a first polarization was collinearly diffracted from a radio frequency acoustic wave in a birefringent crystal to shift polarization of a light beam from a first polarization to a second polarization. The output light was then analyzed to pass only light of the second polarization. The light of the second polarization had a frequency which was variable in accordance with variations in the frequency of the radio frequency acoustic wave within the crystal. Such electrically tunable acousto-optic filters have been characterized by bandwidths of approximately 2 A tunable from 5,000 A to 7,500 A by varying the radio frequency acoustic wave within the crystal from 1,050 MHz to 750 MHz. Such a tunable acousto-optic filter is disclosed in an article titled "Acousto-Optic Tunable Filter," appearing in the Journal of the Optical Society of America, Vol. 59, No. 6, of June 1969, pages 744–747, and in an article titled "Electronically Tunable Acousto-Optic Filter," appearing in the Applied Physics Letters, Vol. 15, No. 10, of Nov. 15, 1969, pages 325–326.

SUMMARY OF THE PRESENT INVENTION

The principal object of the present invention is the provision of improved method and apparatus for spectrum analyzing radio frequency energy.

One feature of the present invention is the provision in a method and apparatus for spectrum analyzing radio frequency energy, of collinearly diffracting polarized light on a radio frequency acoustic wave within an optically anisotropic medium, such acoustic wave being excited by the radio frequency energy to be analyzed, to diffract light, of a first polarization and of a frequency related to the frequency of the acoustic wave, into light of a second polarization, and analyzing the diffracted output light to separate light of the second polarization from the light of the first polarization beam, and spectrum analyzing the separated light to obtain a spectrum corresponding to the spectrum of the radio frequency energy to be analyzed.

Another feature of the present invention is the same as the preceding feature wherein the separated light is spectrum analyzed by producing a spatial separation of light according to frequency.

Another feature of the present invention is the same as the immediately preceding feature wherein the spatially separated light is projected onto a display screen or other photosensitive surface to obtain a display of a spectrum.

Another feature of the present invention is the same as the immediately preceding feature wherein a light attenuator is disposed in front of the display screen, such light attenuator having a gradient of attenuation directed normal to the direction of spatial separation of the light beam to obtain amplitude information in the spectrum display.

Other features and advantages of the present invention will become apparent upon a perusal of the following specification taken in connection with the accompanying drawings wherein:

DESCRIPTION OF THE PREFERRED EMBODIMENTS

Figure 1:
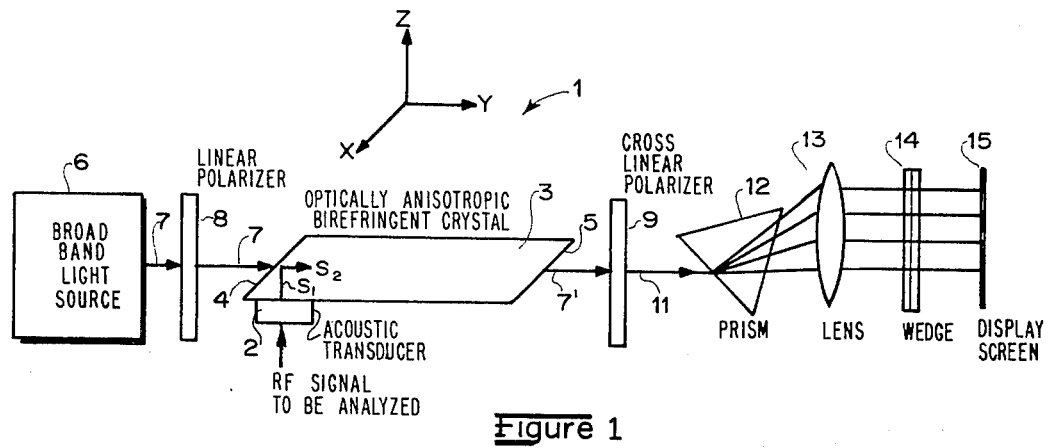
FIG. 1 is a schematic line diagram, partly in block diagram form, depicting an acousto-optic RF spectrum analyzer incorporating features of the present invention.

Referring now to FIG. 1, there is shown an acousto-optic RF spectrum analyzer 1 incorporating features of the present invention. Radio frequency wave energy to be spectrum analyzed is fed to an acoustic transducer 2 for energizing same to produce a longitudinal acoustic wave L in an optically anisotropic medium, such as a birefringent crystal 3. Suitable examples of such birefringent crystals include $LiNbO_3$, $PbMoO_4$, or $CaMoO_4$. End faces 4 and 5 of crystal 3 are cut at the Brewster angle relative to the longitudinal Y axis of the crystal interconnecting the faces 4 and 5. The longitudinal acoustic wave generated by acoustic transducer 2 is reflected from the input face of crystal 3 into a shear wave S which propagates longitudinally of the crystal 3 parallel to the Y axis of the crystal.

A relatively broad band light source 6, such as a white light source, directs a narrow light beam 7 through a linear polarizer 8, such as a vertical polarizer, into the crystal 3 through the input face 4. Vertically polarized input light beam 7 is directed through crystal 3 parallel to the Y axis and collinearly with the acoustic shear wave S within the crystal 3.

The acousto-optic apparatus 1 of FIG. 1 makes use of collinear acousto-optic diffraction in an optically birefringent medium. More particularly, a crystal orientation for crystal 3 is chosen such that the incident linearly polarized light beam 7 is diffracted on the acoustic wave from the input polarization into a second orthogonal polarization. For a given acoustic frequency, only a small range of light frequencies satisfy a momentum $\bar{k}$ vector matching condition, and only this small range of light frequencies is cumulatively diffracted. If the acoustic frequency is changed, the band of light frequencies which the acousto-optic element will diffract from the first polarization into the second polarization is changed. Diffraction into the second orthogonal polarization occurs, for the lithium niobate crystal 3, via the $P_{41}$ photoelastic constant, and is only cumulative if $|k_o|-|k_e|=|k_a|$ where the $_{o,\ e}$ and $_a$ denote the ordinary and extraordinary optical waves, and the acoustic wave respectively. This will be the case if the optical and RF acoustic frequencies $f_o$ and $f_a$ are related by:

$$f_o = (c f_a / V \Delta n) \qquad \text{Eq. (1)}$$

where $(c/V)$ is the ratio of the optical velocity in vacuum to the acoustic velocity in the medium, and $\Delta n$ is the birefringence of the crystal.

Thus, in a typical example employing lithium niobate the band of light frequencies which are diffracted from the first polarization into the second polarization are tunable from 7,000 A. to 5,500 A. by changing the acoustic frequency from 750 MHz to 1,050 MHz. The instantaneous band pass for these tunable frequencies is less than 2 A. for a crystal 5 cm. long.

Therefore, in the acousto-optic system 1 of FIG. 1, the broad band light source 6 provides light uniformly distributed in frequency and intensity over a band of optical frequencies broad enough to cover the band of optical frequencies corresponding to the band of RF frequencies to be analyzed.

In operation, the instantaneous RF frequency components in the RF signal to be analyzed open up corresponding instantaneous band passes in which light of the first polarization is shifted to light of the second polarization in the output beam 7' passing out of the crystal 3. In the output beam 7', the light of the first polarization is mixed with the light of the second polarization. A crossed linear polarizer 9 is provided for analyzing the output light to separate light of the second polarization from light of the first polarization in the output beam. In other words, the crossed linear polarizer 9 is polarized in such a direction as to transmit light only of the second polarization and to exclude passage of light of other polarizations such that the output light beam 11 of crossed linear polarizer 9 comprises only light of the second polarization.

The light beam 11 of the second polarization is then spectrum analyzed by means of a spectrum analyzer, such as prism 12 or a diffraction grating, not shown, which produces a spatial separation of the light according to frequency in spectrum analyzed light beam 11. The spatially separated light beam is focused by means of lens 13 through a wedge attenuator 14 onto a display screen 15 to obtain a display of the RF spectrum of the signal under analysis.

The wedge attenuator 14 comprises a light attenuative medium having a gradient of attenuation directed normal to the direction of spatial separation of the frequency components within the spatially separated light beam 11, whereby amplitude information is obtained in the spectrum display on screen 15.

Figure 2:
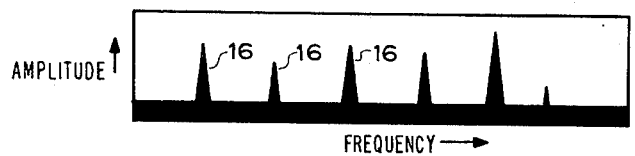
FIG. 2 is a display of amplitude versus frequency depicting a typical output spectrum display obtained from the system of FIG. 1.

A typical spectrum display obtained from display screen 15 is as shown in FIG. 2. The various RF spectral lines are shown as peaks 16, such peaks having an amplitude in accordance with the amplitude of the respective RF component within the signal under analysis. If desired, a permanent record of the display may be obtained by disposing a piece of photographic film at the display screen 15 and exposing such film with the spatially separated light of output beam 11. The film is then developed to produce the permanent recorded spectral display as shown in FIG. 2. Use of the photographic film for recording the spectral display also allows producing a time average of the RF signal under analysis for improving the signal to noise ratio in the spectrum analysis of a repetitive RF signal under analysis. The spectral display at display screen 15 is a real time display allowing a substantially instantaneous readout of the RF spectrum under analysis.

Figure 3:
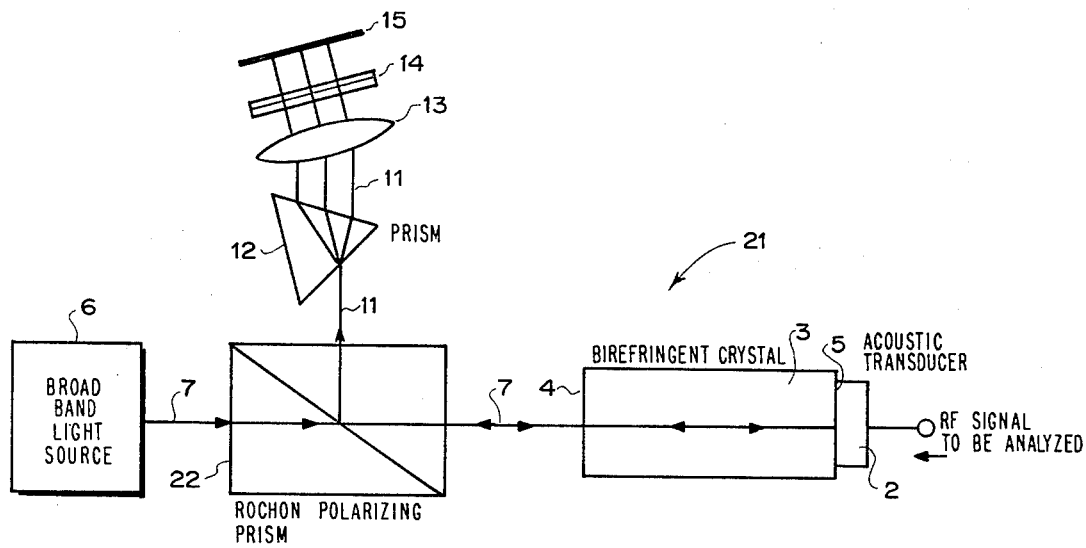
FIG. 3 is a schematic line diagram, partly in block diagram form, depicting an alternative acousto-optic RF spectrum analyzer incorporating features of the present invention.

Referring now to FIG. 3, there is shown an alternative acousto-optic RF spectrum analyzer 21 incorporating features of the present invention. Acousto-optic system 21 is substantially the same as that of FIG. 1 with the exception that opposite ends 4 and 5 of the birefringent crystal 3 are cut at 90° to the longitudinal axis of the crystal 3 to provide an acoustic resonator. The acoustic transducer 2 is affixed to end face 5 for producing the acoustic wave within the birefringent crystal 3. Face 5 of the birefringent crystal which interfaces with the acoustic transducer 2 is coated with a light reflective layer such that light incident on the crystal from the light source 6 is reflected at face 5 and passes out of the crystal 3 through the input face 4 in the reverse direction. In addition, the input polarizer 8 of the system of FIG. 1 is replaced by a Rochon polarizing prism 22 which serves to linearly polarize the input light beam 7 in a first direction, such as in the vertical direction, by passage through the prism 22.

The vertically polarized incident light beam diffracts off the collinear propagating acoustic wave within the birefringent crystal 3 to shift light of a frequency related to the frequency of the acoustic wave via the relationship of Equation (1) to a wave of an orthogonal polarization. The orthogonally polarized light wave is reflected along with the incident light from the reflective surface 5 and cumulatively interacts with the standing acoustic wave to produce further collinear diffraction. The diffracted light and the light which has not been diffracted emerges from the birefringent crystal and is analyzed by polarizing prism 22 such that light of the orthogonal polarization is reflected from the prism into output light beam 11, whereas light of the incident polarization passes through the prism 22 back to the light source 6.

Output beam 11 consisting of the cross-polarized collinearly diffracted light is spectrum analyzed in the same manner as previously described with regard to FIGS. 1 and 2 to produce the output display spectrum of FIG. 2. The bandwidth of radio frequency energy that can be spectrum analyzed employing the acoustic resonant birefringent crystal 3 is limited to acoustic resonant bands of the birefringent crystal 3 such that the output spectrum of FIG. 2 is discontinuous. However, the crystal 3 need not be acoustically resonant in which case the output display will be substantially the same as that previously described with regard to FIGS. 1 and 2.

Figure 4:
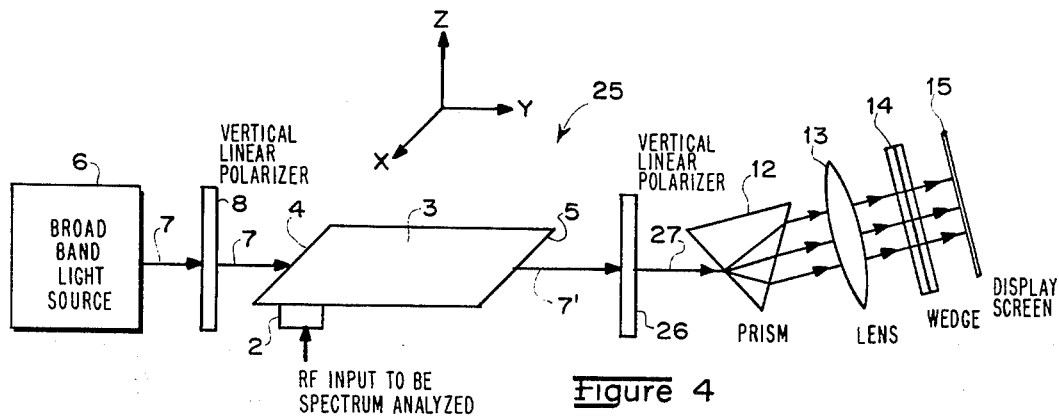
FIG. 4 is a schematic line diagram, partly in block diagram form, depicting an alternative acousto-optic RF spectrum analyzer of the present invention.
Figure 5:
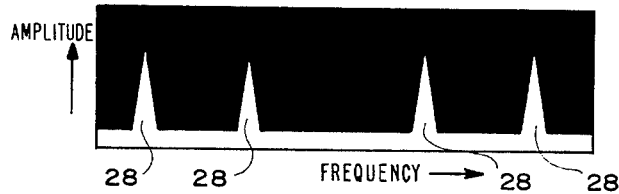
FIG. 5 is a display of amplitude versus frequency depicting the output spectral display of the system of FIG. 4.

Referring now to FIGS. 4 and 5, there is shown an alternative acousto-optic RF spectrum analyzer 25, incorporating features of the present invention. The acousto-optic RF spectrum analyzer 25 of FIG. 4 is substantially the same as that of FIG. 1 with the exception that the output polarizer 26 has the same polarization as the input light polarizer 8. As a consequence, light in the output beam 7' which has been shifted from the vertical polarization to the horizontal polarization, due to the collinear diffraction on the acoustic wave, does not pass through the output analyzer or vertical polarizer 26. Thus, the light beam 27 which passes through the output polarizer 26 contains all of the light incident on the birefringent crystal 3 with the exception of that portion of the light which has been shifted into the orthogonal polarization due to the provision of the collinear diffraction mechanism. The light components which have been shifted to the horizontal polarization correspond to the optical spectrum of the input RF spectrum to be analyzed. Thus, the output light beam 27, as spectrum analyzed by the light spectrum analyzer 12, contains all the frequency components of the input light 7 with the exception of those components corresponding to the RF spectrum to be analyzed. Thus, when the spectrum analyzed light beam 27 is shown on the display screen 15 the screen will be illuminated everywhere with the exception of those spectral portions corresponding to the RF spectrum to be analyzed. The corresponding spectral display output of the spectrum analyzer 25 is shown in FIG. 5 where the output peaks 28 correspond to the RF spectral components of the RF input signal to be analyzed. As in the embodiment of FIGS. 1 and 3, a photographic film may be disposed at the display screen 15 for producing a photographic recording and a time average of the RF spectrum under analysis.

Figure 6:
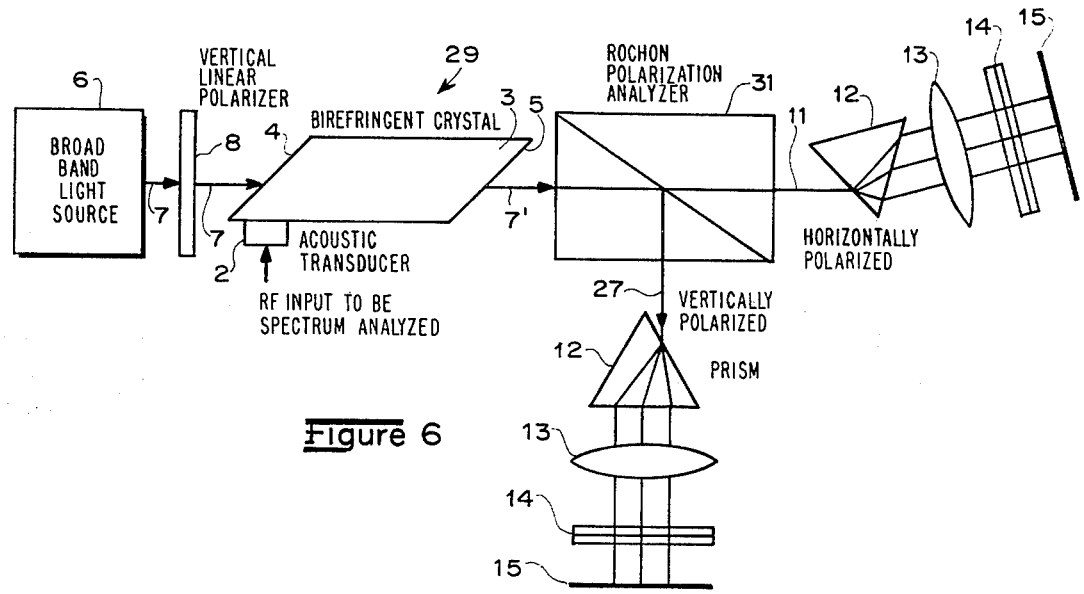
FIG. 6 is a schematic line diagram, partly in block diagram form, depicting an alternative acousto-optic RF spectrum analyzer incorporating features of the present invention.

Referring now to FIG. 6, there is shown an alternative acousto-optic RF spectrum analyzer 29 incorporating features of the present invention. System 29 of FIG. 6 is substantially the same as that previously described with regard to FIGS. 1 and 4 with the exception that the output beam 7' is analyzed by means of a Rochon prism or polarization analyzer 31 which separates the light in the output beam 7' according to its polarization such that light having an orthogonal polarization to the input polarization passes through the analyzer 31 as output beam 11 and light which has the same polarization as the input beam 7 is reflected as output beam 27. Beams 11 and 27 are then spectrum analyzed in the same manner as previously described with regard to FIGS. 1 and 4 to produce output spectral displays of the type shown in FIGS. 2 and 5, respectively.

In the acousto-optic RF spectrum analyzers of FIGS. 1, 3, 4 and 6, the amount of the input light, at the frequency of the acousto-optic filter which is converted from the input polarization to the crossed polarization by diffraction on the acoustic wave is a function of the power density of the acoustic wave in the optically anisotropic medium 3. Also, the percentage of incident light within the band pass of the acousto-optic device that is converted from the first polarization to the second orthogonal polarization varies inversely as the square of the acoustic frequency, i.e., RF frequency to be spectrum analyzed. Therefore, the transfer characteristics for the acoustic transducer 2 or the gain of the RF amplifiers providing the RF input signal to the acoustic transducer 2 should be tailored to provide a uniform output light amplitude with frequency. As an alternative, the light attenuative wedge 14 is provided with an attenuative gradient in the direction of frequency separation of the light components to provide a flat amplitude response with radio frequency amplitude over the operating band of the acousto-optic spectrum analyzer.

As used herein "light" is defined as electromagnetic radiation. Such light need not be confined in the visible spectrum. In some birefringent crystals, the phase velocity and group velocity vectors for the acoustic wave are divergent and may diverge by as much as 20°, as is obtained in the case of quartz. In such a case, the light beam path may be collinear with either the phase or group velocity of the acoustic wave to obtain the "phase matched" collinear diffraction described herein. Therefore, as used herein "collinear" means that the light beam path is collinear with either the phase or group velocity of the acoustic wave.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

We claim:

1. In a method for separating the different frequency components of a radio frequency signal, the steps of exciting an acoustic wave in an optically anisotropic medium at the frequency of the radio frequency signal to be frequency separated, collinearly diffracting a beam of light of selected bandwidth on the acoustic wave within the optically anisotropic medium to diffract light of a first polarization and of a frequency within said selected bandwidth related to the frequency of the acoustic wave into light of a second polarization, analyzing the diffracted output light beam to separate light of the second polarization from light of the first polarization, and spectrum analyzing the separated light within the selected bandwidth to provide spatial separation of the light to provide information concerning the different frequency components of the radio frequency signal, providing an output indication of the spectrum of the components of the radio frequency signal, and attenuating the intensity of the spatially separated light along a gradient aligned substantially normal to the spatial separation of spectral components to provide light-intensity indications at the spatial separations of the light that are representative of the amplitudes of the corresponding frequency components of the radio frequency signal.

2. The method of claim 1 wherein the step of spectrum analyzing the separated light comprises the step of spectrum analyzing the separated light of the second polarization.

3. The method of claim 1 wherein the step of spectrum analyzing the separated light comprises the step of spectrum analyzing the separated light of the first polarization.

4. The method of claim 1 wherein the beam of light is a beam of white light.

5. Acousto-optic apparatus comprising optically anisotropic medium means, means for exciting an acoustic wave in an optically anisotropic medium means at a frequency related to a radio frequency input signal, source means for introducing into said anisotropic medium means a beam of light having a selected bandwidth and having a first polarization to collinearly diffract on the acoustic wave within the optically anisotropic medium means the light of the first polarization and of a frequency related to the frequency of the acoustic wave into light of a second polarization, means for analyzing the diffracted output light beam to separate light of the second polarization from light of the first polarization, means for spectrum analyzing the separated light within said selected bandwidth to produce a spatial separation of the light according to frequency of the light to provide information concerning the different frequency components of the radio frequency input signal, displaying means for providing an indication of the spectrum of the radio frequency input signal, and light attenuating means disposed in the light path of the spatially separated light through which such light is projected toward said displaying means, said attenuating means having a gradient of attenuation oriented generally normal to the direction of spatial separation of the light beam to provide light-intensity indications at the spatial separations of the light that are representative of the amplitudes of the corresponding frequency components of the radio frequency input signal.

6. The apparatus of claim 5 wherein said means for spectrum analyzing the separated light comprises means for spectrum analyzing the separated light of the second polarization.

7. The apparatus of claim 5 wherein said means for spectrum analyzing the separated light includes means for spectrum analyzing the separated light of the first polarization.

8. The apparatus of claim 5 wherein said source means includes a source of white light for producing said beam of light of selected bandwidth.

* * * * *